United States Patent
Morimoto et al.

(10) Patent No.: US 6,302,573 B1
(45) Date of Patent: Oct. 16, 2001

(54) MIXING METHOD OF POWDERED OR GRANULAR MATERIAL UTILIZING PULSATING VIBRATION AIR

(75) Inventors: Kiyoshi Morimoto; Yasushi Watanabe; Yoshika Sanada, all of Shizuoka; Sanji Tokuno, Tokyo; Kazue Murata, Ikoma, all of (JP)

(73) Assignees: Kyowa Hakko Kogyo Co., Ltd., Tokyo (JP); Kabushikikaisha Matsui Seisakusho, Osaka (JP)

( * ) Notice: Subject to any disclaimer, the term of this patent is extended or adjusted under 35 U.S.C. 154(b) by 0 days.

(21) Appl. No.: 09/289,556

(22) Filed: Apr. 12, 1999

Related U.S. Application Data (63) Continuation-in-part of application No. 08/658,260, filed on Jun. 5, 1996.

(30) Foreign Application Priority Data

Jun. 9, 1995 (JP) .................................................. 7-143277

(51) Int. Cl.[7] ...................................................... B01F 13/02
(52) U.S. Cl. ......................... 366/106; 366/136; 422/145
(58) Field of Search ................................... 366/101, 106, 366/107, 136, 137; 422/139, 143, 145; 241/18, 38, 39, 47, 48, 49, 50, 51, 53; 406/88, 90, 91, 138, 136; 222/195; 118/95; 137/826, 829, 830, 832; 251/304, 305

(56) References Cited

U.S. PATENT DOCUMENTS

| | | | |
|---|---|---|---|
| 1,971,852 | * | 8/1934 | Goebels . |
| 2,171,398 | * | 8/1939 | Hastert . |
| 2,586,818 | * | 2/1952 | Harms . |
| 2,750,681 | * | 6/1956 | Berry . |
| 2,844,361 | * | 7/1958 | Dilcher et al. . |
| 2,980,138 | * | 4/1961 | Detweiler et al. . |
| 3,003,752 | * | 10/1961 | Frost . |
| 3,136,531 | * | 6/1964 | Wesselingh . |
| 3,386,182 | * | 6/1968 | Lippert . |
| 3,807,355 | * | 4/1974 | Goldberg . |
| 3,861,753 | * | 1/1975 | Lesk et al. . |
| 4,168,913 | * | 9/1979 | Kono . |
| 4,217,127 | * | 8/1980 | Kono et al. . |
| 4,440,528 | * | 4/1984 | Mowatt-Larssen et al. . |
| 4,508,620 | * | 4/1985 | Jajima et al. . |
| 4,747,942 | * | 5/1988 | Strauss . |
| 4,875,435 | * | 10/1989 | Jan et al. . |
| 4,881,574 | * | 11/1989 | Olson et al. . |
| 5,296,265 | * | 3/1994 | Okuma et al. . |

* cited by examiner

Primary Examiner—Tony G. Soohoo
(74) Attorney, Agent, or Firm—Jones, Tullar & Cooper, P.C.

(57) ABSTRACT

A mixing and blending method for powdered or granular material includes supplying pulsating vibration air into an airtight tank from a bottom thereof. An airtight tank having a porous bottom plate on which the material is stored is provided for the mixing and blending method. In the system pulsating vibration air is generated by periodically increasing and decreasing the amount of blowing air at a low frequency. Pulsating vibration air is introduced into the airtight tank from the bottom of the airtight tank so as to generate air flow going upward through the porous bottom of the airtight tank. As a result, powdered or granular material stored on the porous bottom plate in the airtight tank is uniformly mixed and blended in the airtight tank while continuously moving up and down as in a convectional manner.

6 Claims, 9 Drawing Sheets

MIXING METHOD OF POWDERED OR GRANULAR MATERIAL UTILIZING PULSATING VIBRATION AIR

CROSS REFERENCE TO RELATED APPLICATION

This application is a CIP of application Ser. No. 08/658,260 Jun. 5, 1996.

FIELD OF THE INVENTION

The present invention relates to the field of material mixing, breaking of caked material, pneumatic transportation and granulation, and in particular a handling method and system for powdered or granular material using pulsating vibration air.

PRIOR ART

Conventionally, powdered or granular material has been mixed or blended in a tank by rotating a mixing vane provided in the tank or by supplying pressurized air from the bottom of the tank to blow the material.

Powdered or granular material stored in a tank has been pneumatically transported in a transport pipe by supplying pressurized air into the tank while the tank is made airtight.

However, such a conventional mixing method of material wherein a material container is rotated or a mixing vane is provided in the tank has the disadvantage that the construction is complex and the system is noisy when material is being mixed. Further, for highly adhesive or absorbent material, the material adheres to the tank and on the mixing vane.

Moreover, in the conventional mixing method, the air to blow up the material in the tank generates turbulent flow because the material in the tank is blown up by supplying pressurized air from the bottom of the tank. As a result, only the material stored in the center of the tank is scattered upwardly in the tank, with a lot of fine particles being generated. Under these circumstances, the material can't be mixed uniformly.

In a conventional pneumatic transportation system for powdered or granular material, a rathole, that is an air passage, is formed in one part of a layer of the material when the material stored in the tank is highly absorbent. When such a rathole is formed, only pressurized air is transported and the material can't be transported nor discharged completely.

Further, if highly adhesive material or highly absorbent material such as food stuff is stored in the tank for a while, such material is concreted or caked in the tank, or bridging of the material is formed when the material is discharged.

An air hammer or a vibrator is provided for the tank in a conventional system in order to solve the above-mentioned problems. However, the air hammer or vibrator causes vibration, noise and furthermore causes tank deformation. Depending on the material, air contained in a space between particles is discharged so that the material is caked and blockage is promoted.

SUMMARY OF THE INVENTION

An object of the present invention is to provide a method wherein powdered or granular material is mixed uniformly without using a mixing vane. A further object of the present invention is to provide a method wherein powdered or granular material is effectively mixed and transported in a transport pipe without generating adhesion or blockage of the material in a storage tank and the transport pipe even if the material is highly cohesive. A still further object of the present invention is to provide a method of breaking the concreted or caked powdered or granular material and to provide a granulating system A mixing and blending method of powdered or granular material is proposed for supplying pulsating vibration air into an airtight tank from a bottom thereof The airtight tank has a porous bottom plate on which the material is stored. In the mixing and blending method, pulsating vibration air is generated by periodically increasing and decreasing the amount of blowing air at a low frequency, and pulsating vibration air is introduced into the airtight tank from the bottom of the airtight tank so as to generate air flow which travels upward through the porous bottom plate of the airtight tank. Therefore, powdered or granular material stored on the porous bottom plate in the airtight tank is uniformly mixed and blended in the airtight tank while continuously moving up and down in a convectional manner.

A break method of blocking powdered or granular material stored in an airtight tank utilizing pulsating vibration air is provided. In the break method, air is injected into the airtight tank through a porous bottom plate on which the material is stored, pulsating vibration air is simultaneously generated and introduced into the airtight tank. The pulsating vibration air is generated by periodically increasing and decreasing the amount of blowing air at a low frequency. As a result, caked or adhered material in the airtight tank is broken.

A mixing and blending system for powdered or granular material utilizing pulsating vibration air is comprised of an airtight tank having a porous bottom plate for storing powdered or granular material thereon. The system is also provided with pulsating vibration air generation means for generating pulsating vibration air by periodically increasing and decreasing the amount of the blowing air at a low frequency and for supplying the pulsating vibration air into the airtight tank from the bottom of the airtight tank through the porous bottom plate.

A mixing and blending system for powdered or granular material utilizing pulsating vibration air is provided with an airtight tank having a porous bottom plate for storing powdered or granular material thereon, and pulsating vibration air generation means for generating pulsating vibration air by periodically increasing and decreasing the amount of blowing air at a low frequency and for supplying the pulsating vibration air into the airtight tank from the bottom of the airtight tank through the porous bottom plate. The system is also provided with material recovery means provided above the airtight tank and having a filter for collecting and separating fine particle dispersing in the airtight tank from air, and the material recovery means has a suction port for drawing fine particles dispersing in the airtight tank and a discharge port for returning powdered or granular material collected by the filter into the airtight tank.

A pneumatic transport system for powdered or granular material utilizing pulsating vibration air is comprised of an airtight tank having a porous bottom plate for storing powdered or granular material thereon, and pulsating vibration air generation means for generating pulsating vibration air by periodically increasing and decreasing the amount of blowing air at a low frequency and for supplying the pulsating vibration air into the airtight tank from the bottom of the airtight tank through the porous bottom plate. The pneumatic transport system is also comprised of gas supply means for supplying pressurized air in the airtight tank so as to forcibly send forth the powdered or granular material outwardly from the airtight tank.

A pneumatic transport system for powdered or granular material utilizing pulsating vibration air is provided, where material recovery means causes convection while drawing the fine particles dispersing in the airtight tank, separates the material from the air, and returns it to the airtight tank as recovery material when powdered or granular material is mixed and blended.

A pneumatic transport system for powdered or granular material utilizing pulsating vibration air is provided, where the material recovery means draws the fine particles dispersing in the airtight tank, separates the material from the air and returns it to the airtight tank as recovery material when powdered or granular material in the airtight tank is pneumatically transported out of the airtight tank.

A granulating system for powdered or granular material stored in an airtight tank having a porous bottom plate and a spray gun, wherein material is granulated by spraying liquid binder with the spray gun while material is dispersing over the porous bottom plate in the airtight tank. The system is provided with pulsating vibration air generation means for generating pulsating vibration air by periodically increasing and decreasing the amount of blowing air at a low frequency and for supplying the pulsating vibration air into the airtight tank from the bottom of the tank through the porous bottom plate, and gas supply means for supplying pressurized air in the airtight tank so as to forcibly send forth the powdered or granular material outwardly from the airtight tank after the powdered or granular material is made into a granular object.

According to the present mixing method, powdered or granular material stored on a porous bottom plate is lifted up and floated over the plate by supplying pulsating vibration air whose air flow goes up from the bottom of the tank in such a manner that the material volume inflates and material is continuously moved up and down. In other word, convection movement occurs in the airtight tank to mix and blend powdered or granular material stored in the airtight tank as though it is fluid material As a result, the material is efficiently and uniformly mixed and blended in the tank without troublesome noise.

In the present invention, the pulsating vibration air has adequate oscillating energy of low frequency which uniformly lifts up the powdered or granular material stored on the porous bottom plate in the airtight tank in such a manner that the whole volume of the material inflates in the airtight tank so as to cause convection, as in fluid material.

According to experimental findings, the powdered or granular material in the tank flows like a fluid and generates convection while making waves on its surfaces, so that the material is mixed uniformly.

According to the mixing method of the present invention, there is no need to provide a mixing vane in a tank nor rotating a tank. As a result, little noise is generated when the material is mixed and the amount of the material stored in the tank can be made large comparing to a mixer with a mixing vane or a tumbler type mixer.

According to the breaking method for caked powdered or granular material, the material receives oscillation while an air stream acts in the direction of pushing up the material layer by feeding pulsating vibration air from the bottom of the tank through the porous bottom plate. Therefore, the caked material is broken by the pulsating vibration air and dispersed by the air flow.

In this case, the material can be dispersed efficiently without causing noise or damage, and bridging of material caused when the material is discharged can be easily broken compared to a prior method wherein an air hammer or a vibrator, which causes damage to the tank, is provided.

According to the mixing and blending system the mixing and blending method can be effectively executed. Pulsating vibration air is supplied in the direction of pushing up the material in the tank through plural holes of the porous bottom plate from the bottom of the tank by driving pulsating vibration air generation means. Convection is forcibly caused on the material in the tank so that the material can be mixed and blended uniformly.

According to such a mixing system, little noise is generated when the material is mixed because a mixing vane isn't provided. Further, the amount of the material stored in the tank can be made large and wear on the material can be minimized compared to a mixer with a mixing vane or a tumbler type mixer.

In the mixing and blending system wherein fine particles produced during material ming is separated into powdered or granular material and exhaust air by material recovery means and the separated material is returned to the tank as recovery material waste consumption of the material can be avoided. In such material recovery means, an inlet of fine particles is always opened when the material is mixed but a material discharge port is opened periodically and separated material is collected in the tank.

According to the pneumatic transport system of powdered or granular material utilizing pulsating vibration air, the mixed material, caked part of which is broken by supplying pulsating vibration air in the tank, is dispersed by pulsating vibration air. Then the material is transported according to the air flow caused by pressurized air supplied from gas feeding means.

When powdered or granular material stored in the tank is pneumatically transported in a transport pipe, cohesive material is apt to adhere on the inside of the tank or the pipe and material with low fluidity is apt to stay in the bottom of the tank. In both cases, the tank or the pipe is blocked up with the material. However, with the present invention, impact of air oscillation on the material which is going to adhere to be caked in the pipe or going to stay in the bottom of the tank is provided. Therefore, adherence or caking of the material ca be prevented and the material can be transported smoothly without causing blockage.

According to the prior art wherein material is pneumatically transported in a transport pipe by feeding pressurized air in a tank, highly hygroscopic material causes a so-called rathole which is an air passage formed in a layer of powdered or granular material. When the rathole is generated, only air is transported. However, with the present invention, appropriate shock is applied by pulsating vibration air so as to break the caked material layer. As a result, generation of ratholes can be prevented from happening.

According to the pneumatic transport system for powdered or granular material by utilizing pulsating vibration air, the material can be blended uniformly by forcible convection caused in the tank by the use of pulsating vibration air. Fine particles floating above the material layer in the tank are separated into powdered or granular material and exhaust air by material recovery means. The separated material is returned to the tank periodically so that waste consumption of the material ca be prevented.

In the granulating system for powdered or granular material by the use of pulsating vibration air, pulsating vibration air is supplied in the direction of pushing up the material from the bottom of the tank so as to lift up the material in the tank. The material is granulated by a liquid binder injected from a spray gun while the material is floating in the tank.

The granulated material is transported by air flow generated by pulsating vibration air and by pressurized air supplied from gas feeding means. Therefore, adhesion of material to a granulator, blockade in a transport pipe and a rathole in the material layer does not occur and smooth pneumatic transportation out of the granulator can be achieved.

DETAILED DESCRIPTION OF THE PREFERRED EMBODIMENT

Several embodiments of a mixing and blending method and system and a pneumatic transport system for powdered or granular material by the use of pulsating vibration air according to the present invention will be explained referring to attached drawings.

Figure 1:
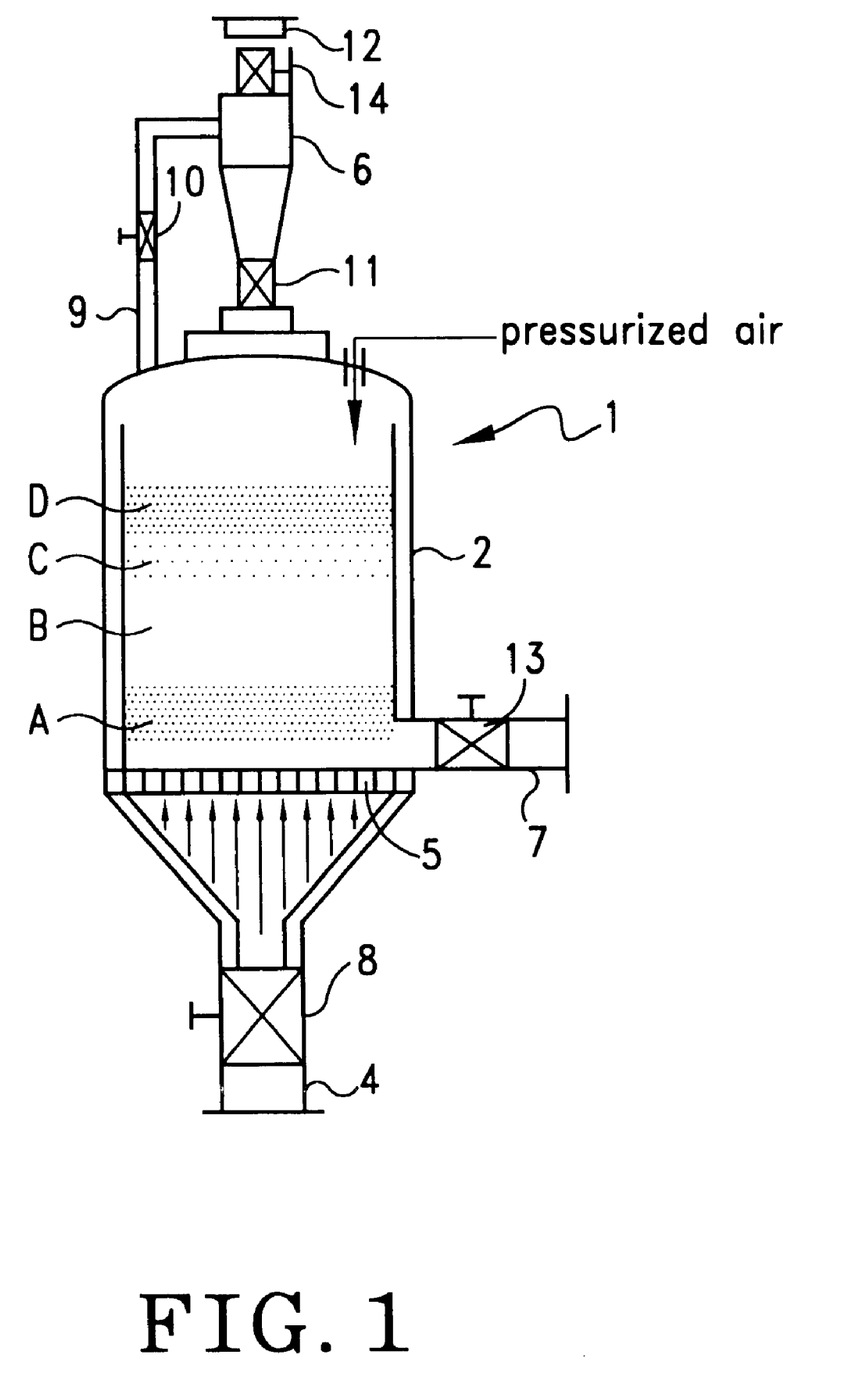
FIG. 1 shows one embodiment of a mixing and blending system for powdered or granular material according to the present invention.

FIG. 1 shows the basic construction of a mixing and blending system 1 of the present invention. The mixing system 1 is provided with an airtight tank 2 for storing powdered or granular material supplied from a hopper (not shown), a porous bottom plate 5 through which pulsating vibration air is fed to the tank via a conduit pipe 4, a cyclone 6 constructed as a material feeder for separating fine particles generated when the material is mixed in the tank 2 while pulsating vibration air is supplied into the powdered or granular material and exhaust air and for recovering the separated material. The mixing system 1 is also provided with a transport pipe 7 for transporting the material mixing in the tank 2. Pressurized air is supplied from the upper pat of the tank 2 by the use of air supply means (not shown).

The numeral 8 refers to a valve provided for the conduit pipe 4, the numeral 9 refers to a recovery pipe with a valve 10 provided for the cyclone 6, and the numeral 11 refers to a valve provided under the cyclone 6 for dropping the material collected in the cyclone 6 into the tank 2. The numeral 12 refers to a dusts collecting duct provided above the cyclone 6, the numeral 13 refers to a valve for transportation provided for the transport pipe 7, and the numeral 14 refers to an exhaust valve.

How the material is mixed and blended in the mixing system 1 is now described hereinafter.

Figure 2:
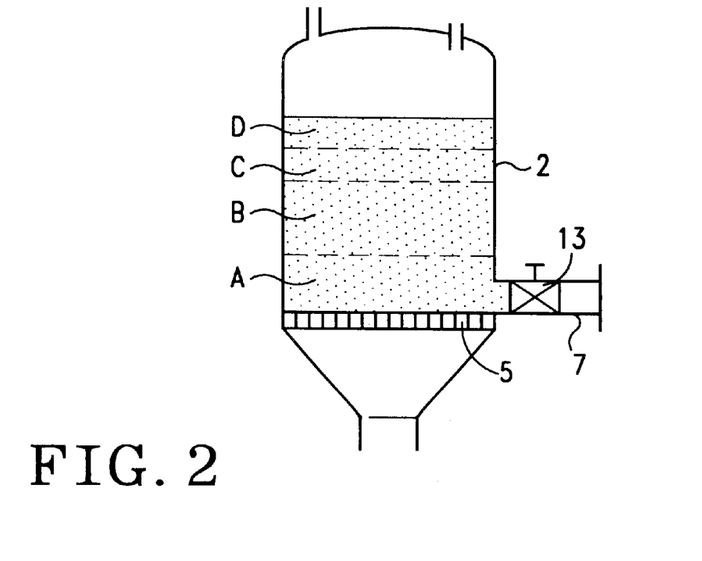
FIG. 2 shows a condition before the material is convectionally mixed according to one embodiment of a mixing and blending system for powdered or granular material of the present invention.

Different kinds of powdered or granular material A, B, C and D are stored on the porous bottom plate 5 in the tank 2 in the order of feeding from the hopper. The materials are layered and stored from the bottom to the upper middle part of the tank 2. The materials A, B, C, and D have different specific volume, particle diameter, adhesion and material properties.

When the material is mixed or the caked material is broken, the pulsating vibration air generator is driven while the valve 8 is opened and the valve 13 is closed. Then pulsating vibration air is supplied under the porous bottom plate 5 through the conduit pipe 4.

Figure 3:
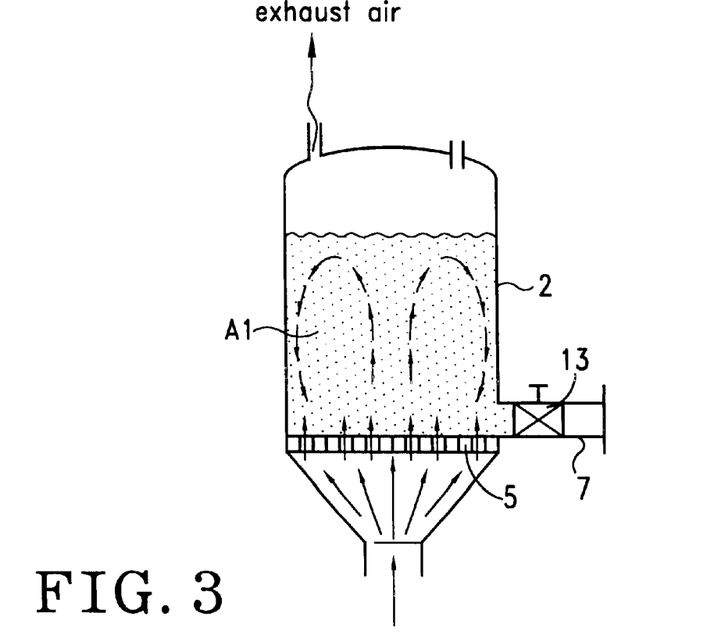
FIG. 3 shows a condition when the material is convectionally mixed according to one embodiment of a mixing and blending system for powdered or granular material of the present invention.

Pulsating vibration air applied under the lowest layer A of the material as shown in FIG. 3 generates laminar flow by means of the porous bottom plate 5. The material in the tank 2 is lifted by the uniform pressure of the air. Then the material in a lower layer goes upward and the material in an upper layer goes downward so that convection occurs in the tank 2. Therefore, the material can be efficiently and uniformly mixed while its surface waves like a fluid.

The valves 11 and 14 of the cyclone 6 are closed while the materials A, B, C and D are mixed in the tank 2, and fine particles generated during mixing are collected in the cyclone 6 through the recovery pipe 9 shown in FIG. 1. The collected fine particles are separated into powdered or granular material and exhaust gas. The exhaust gas is discharged to the outside through the duct 12 and the material falls to the cyclone 6 to be stored. Then the separated material can be returned to the tank 2 when the valve 11 is opened.

Figure 4:
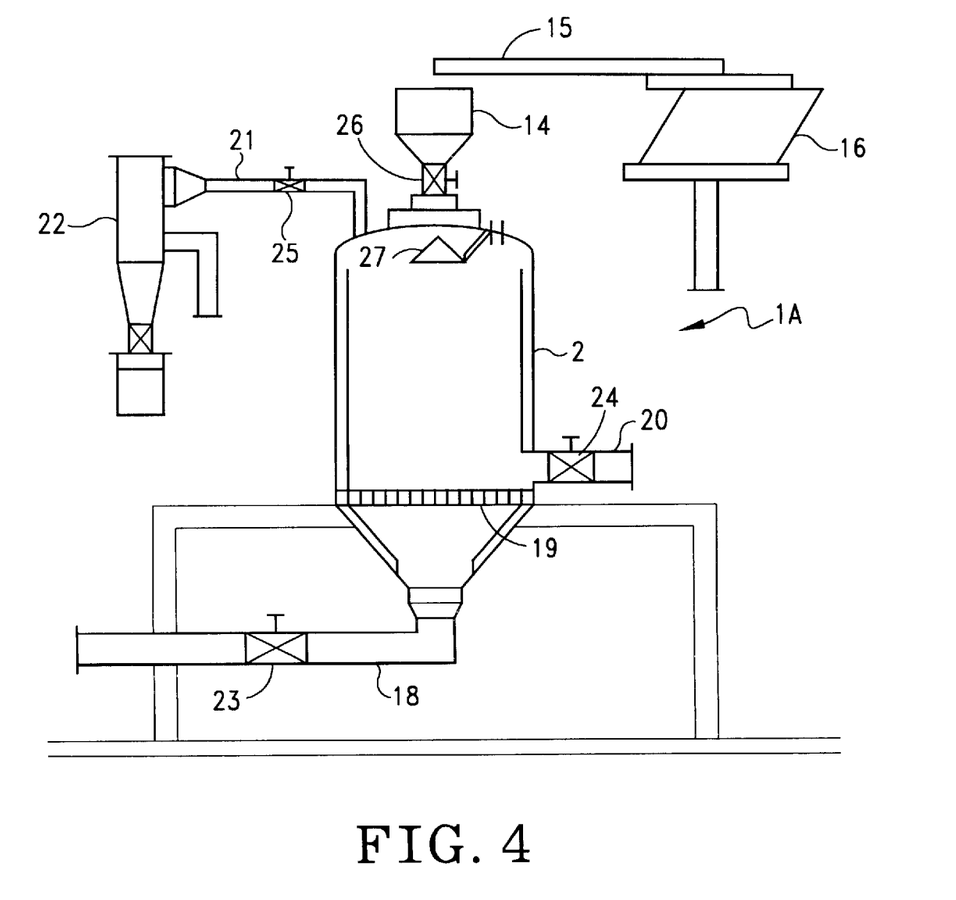
FIG. 4 shows a construction of a first embodiment of a pneumatic transport system for powdered or granular material according to the present invention.

FIG. 4 shows a pneumatic transport system 1A. The system 1A is provided with a tank 2 for storing powdered or granular material, a hopper 14 for feeding the material into then tank 2, a trough 15 for supplying the material into the hopper 14, a vibrating feeder 16 for feeding the material into the trough 15. The tank 2 includes a porous bottom plate 19 in its bottom and is provided with a transport pipe 20. A cyclone 22 is communicated with the upper part of the tank 2 via a connecting pipe 21. Valves 23, 24 and 25 are provided for the conduit pipe 18, the transport pipe 20 and the connecting pipe 21 respectively. The valve 23 controls supply of pulsating vibration air, and the valve 24 opens and closes the transport pipe 20. The valve 25 is opened when fine particles are taken in and separated material is returned to the tank 2, otherwise it is closed.

A valve 26 is provided between the upper part of the tank 2 and the hopper 14 to control feeding of the material by its opening and closing operation. A baffleplate 27 formed like a flashing is provided under the hopper 14 in the tank for scattering the fed material. Pressurized gas is supplied into the tank 2 from gas supply means (not shown).

How the mixed material is pneumatically transported in the transport system 1A is explained hereinafter.

The material fed from the vibration feeder 16 through the trough 15 falls on the porous bottom plate 19 in the tank 2 via the hopper 14 when the valve 26 is opened.

With material stored in the tank 2, the valves 24 and 26 are closed. Then the valve 23 is opened so as to feed pulsating vibration air into the tank 2 from the pulsating vibration air generator (not shown) through the conduit pipe 18 and the material in the tank 2 is uniformly mixed by convection. Fine particles generated during material mixing are collected in the cyclone 22 via the connecting pipe 21.

After the material is mixed, the material in the tank 2 is discharged to the transport pipe 20 by opening the valve 24 while receiving pulsating vibration air fed under the plate 19. In this case, the material can be pneumatically transported more efficiently if pressurized air is supplied in the tank 2.

When the material stored in the tank 2 is pneumatically transported into the transport pipe 20 from the discharge port, cohesive material is apt to adhere in the pipe 20 and material with low fluidity is apt to stay in the bottom of the tank 2, resulting in blockage of the transport pipe 20. However, in the present invention, the material which is going to adhere in the pipe 20 or stay in the bottom of the tank 2 receives shock by pulsating vibration air fed into the tank 2 so that adherence and caking of the material are prevented. As a result, blockage or bridging of the material can be effectively prevented.

When pressurized air is supplied in the tank 2 while the stored material is discharged into the transport pipe 20, hygroscopic material often generates an air passage (rathole) in one part of the material layer. In such a case, only air is transported. However, in the present invention, the caked material layer is broken by appropriate shock produced pulsating vibration air. Therefore, such a problem can be solved and the material stored in the tank 2 can be smoothly transported without leaving the material in the tank 2.

Figure 5:
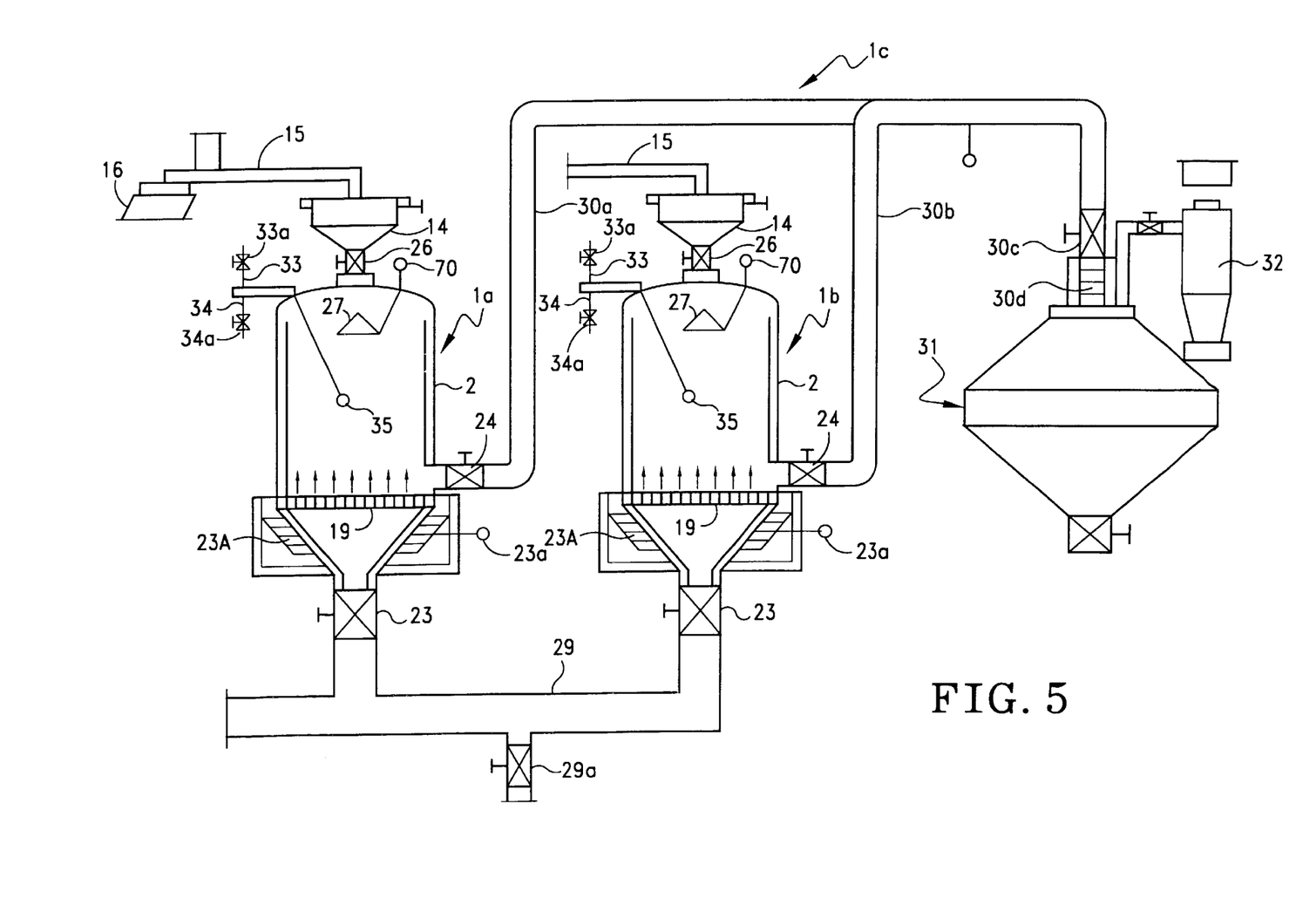
FIG. 5 shows a construction of a second embodiment of a pneumatic transport system for powdered or granular material according to the present invention.

FIG. 5 shows another pneumatic transport system 1C. In this system, mixing means 1a and 1b are provided. The mixing means 1a and 1b are in communication by a transmission pipe 29 having a valve 29a for draining cleaning water. These mixing means 1a and 1b are provided with rising transport pipes 30a and 30b respectively and both pipes 30a, 30b are connected.

The rising transport pipe 30b is connected to an upper part of drying means 31 via a material feeding valve 30c and a zigzagged chute 30d. Further, a cyclone 32 is provided above the drying means 31.

A pipe 33 for supplying compressed air for transporting and drying of the material and a pipe 34 for feeding cleaning water are connected to the tank 2 of the mixing means 1a and 1b respectively. The pipes 33 and 34 can be switched by the valve 33a and 34a respectively. In the tank 2, a spray ball 35 is provided for spraying compressed air or cleaning water in the tank 2.

The numeral 70 refers to an indicator of the internal pressure of the tank 2. A drop of inner pressure indicates generation of a rathole, so more pulsating vibration air is supplied in order to prevent the formation of a rathole beforehand.

The numeral 23A refers to an ultrasonic generator and the numeral 23a refers to a pressure sensor to detect generation of pulsating vibration air. The tank is designed to be supplied with pressurized air from the pressurized gas supply means (not shown). As the same numerals are used as are used in describing the pneumatic transport system 1A of FIG. 4, their explanations are omitted here.

The materials from the hopper 14 stored in the tank 2 provided for the mixing means 1a and 1b respectively are mixed by the convectional flow caused by the pulsating vibration air generator (not shown) via the transmission pipe 29. Then the materials are transported in the transport pipes 30a and 30b, blended in the connecting part of both pipes and further transported to the drying means 31 to be stored therein via the zigzagged chute 30d.

The material stored in the drying means 31 is dried by feeding dehumidifying air. As the function of the cyclone 32 is almost the same as the cyclone 22 of the first embodiment, the explanation is omitted.

After the material is mixed and transported, cleaning water is supplied and filled in the tank 2 from the spray ball 35 when the valve 34a is opened, and cleaning by means of ultrasonic wave energy, described hereinafter, is executed.

After cleaning, the valve 34a is closed and compressed air is supplied in the tank 2 by opening the valve 33a so that the inside of the tank 2 is dried.

Figure 6:
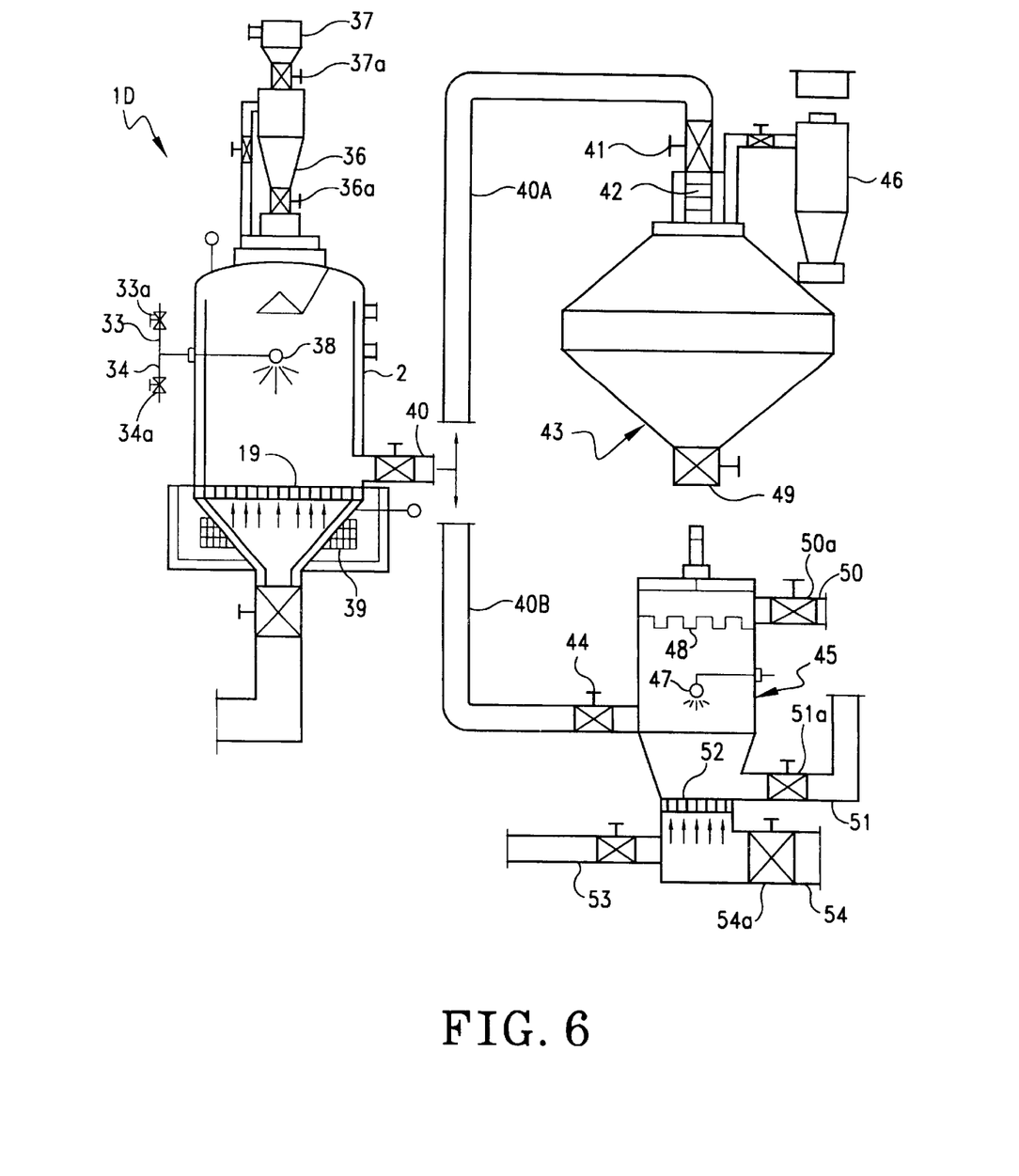
FIG. 6 shows a construction of a third embodiment of a pneumatic transport system and a granulating system for powdered or granular material according to the present invention.

FIG. 6 shows another pneumatic transport system 1D. In this system a cyclone 36 is provided above a tank 2 via a first supply valve 36a and a hopper 37 is further provided via a second supply valve 37a above the cyclone 36. A spray ball 38 is provided in the upper part of the tank 2 for switching of feeding compressed air for transportation, dehumidifying air and cleaning water. An ultrasonic generator 39 is provided under the tank 2 for applying ultrasonic vibration to the cleaning water fed in the tank 2.

A transport pipe 40 is branched into two parts 40A and 40B. The upper part 40A is connected to a mixer 43 having a drying function via a material supply valve 41 and a zigzagged chute 42. The lower pipe 40B is connected with a granulator 45 having a drying function through a material supply valve 44.

A cyclone 46 is provided above the mixer 43 and a material discharge valve 49 is provided under the mixer 43. A spray gun 47 is provided in the granulator 45 for feeding a binder liquid and a filter 48 is provided above the spray gun 47. An exhaust pipe 50 with an exhaust valve 50a is provided at the upper side of the granulator 45 and a transport pipe 51 with a valve 51a for driving and stopping transportation is provided for the lower part of the granulator 45. A porous bottom plate 52 is provided at the bottom of the granulator 45 and a conduit pipe 53 is connected under the porous bottom plate 52 for supplying pulsating vibration air in a tank 45A of the granulator 45 through the porous bottom plate 52. Further, a suction pipe 54 is connected with the bottom of the tank 45A via a suction valve 54a.

According to the pneumatic transport system 1D, the material mixed in the tank 2 by supplying pulsating vibration air is transported in the transport pipe 40 and branched to the upper pipe 40A and the lower pipe 40B by opening the valve 40a. Then the material is fed into the mixer 43 and the granulator 45. The material fed into the mixer 43 is further mixed and dried, then discharged by opening the valve 49. As the function of the cyclone 46 is the same as the cyclone mentioned above, the explanation is omitted.

The material fed into the granulator 45 is granulated by the binder liquid fed from the spray gun 47 while suspending above the porous bottom plate 52 by pulsating vibration air. Then air is supplied in the granulator 45 through the suction pipe 54 by opening the valve 54a so as to dry the tank 45A. When pulsating vibration air is fed via the conduit pipe 53 and the valve 51a is opened, the material is transported in the transport pipe 51 by the compressed air supplied in the tank 45A.

The filter 48 is provided in the tank 45A so as to separate fine particles suspended during granulation into powdered or granular material and exhaust air. Only exhaust air is discharged outside from the pipe 50 by opening the valve 50a.

After mixing and transportation, cleaning water is supplied from the spray ball 38 and fills tank 2, the ultrasonic generator 39 is driven and simultaneously a vacuum suction is executed by means of the spray ball 38. Then the cleaning water in the tank 2 is vibrated by ultrasonic wave energy and the bubbles formed are sucked by vacuum drawing, resulting in efficient cleaning of the tank 2 including unevenness therein.

Figure 7:
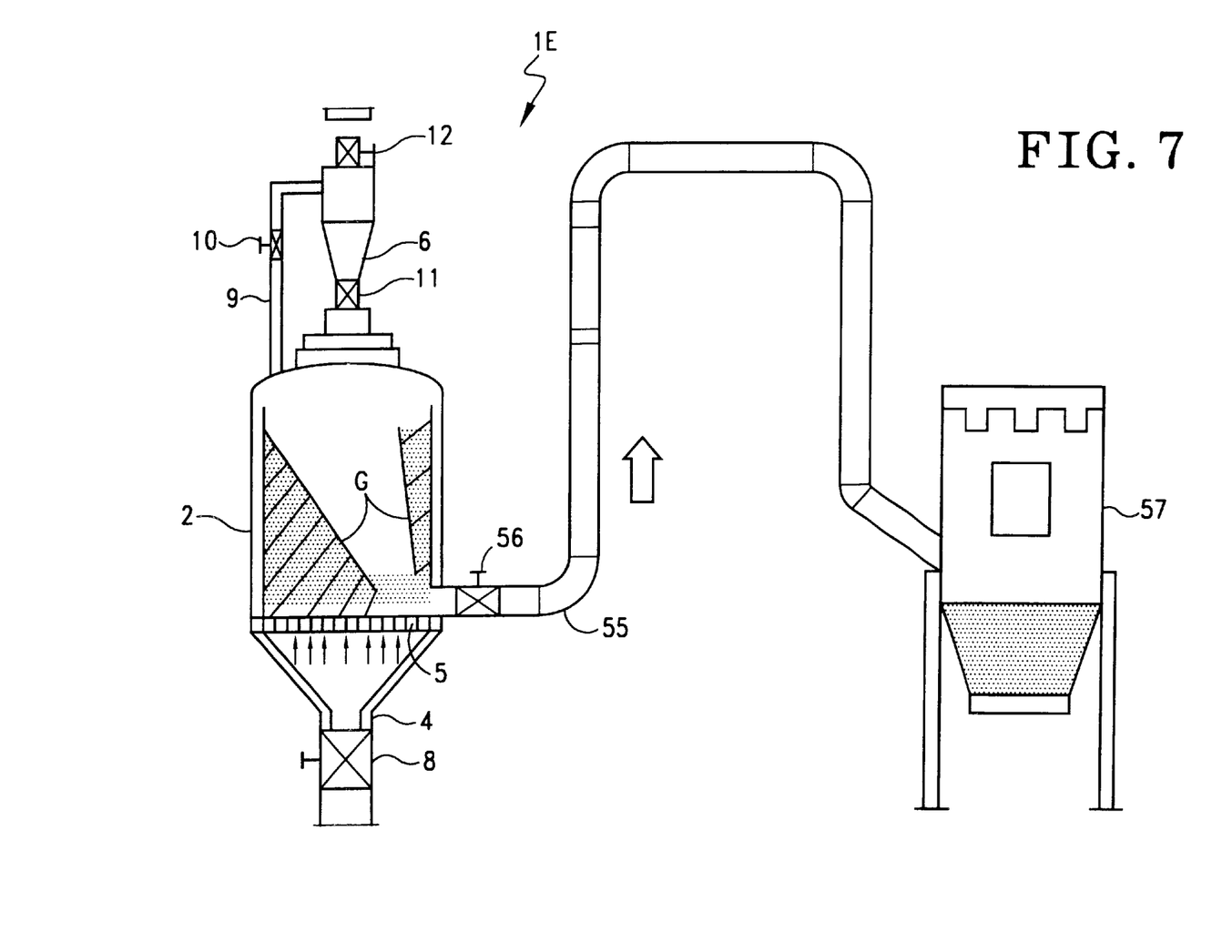
FIG. 7 shows a construction of a fourth embodiment of a pneumatic transport system for powdered or granular material according to the present invention.

FIG. 7 shows another embodiment of a pneumatic transport system 1E. In this system 1E, a transport pipe 55 is communicated under a tank 2 of mixing means 1 via a valve 56 for driving and stopping transportation as shown in FIG. 1. A granulator 57 is connected downstream of the transport pipe 55.

When the material fed in the tank 2 gathers and forms bridging G in the bottom of the tank 2 as shown in FIG. 7, the bridging G can be easily broken by applying pulsating vibration air by driving pulsating vibration air generator.

After the bridging G is broken, plug transportation of the material is executed in the transport pipe 55 by the use of pulsating vibration air into the granulator 57 wherein the material is granulated.

Figure 8:
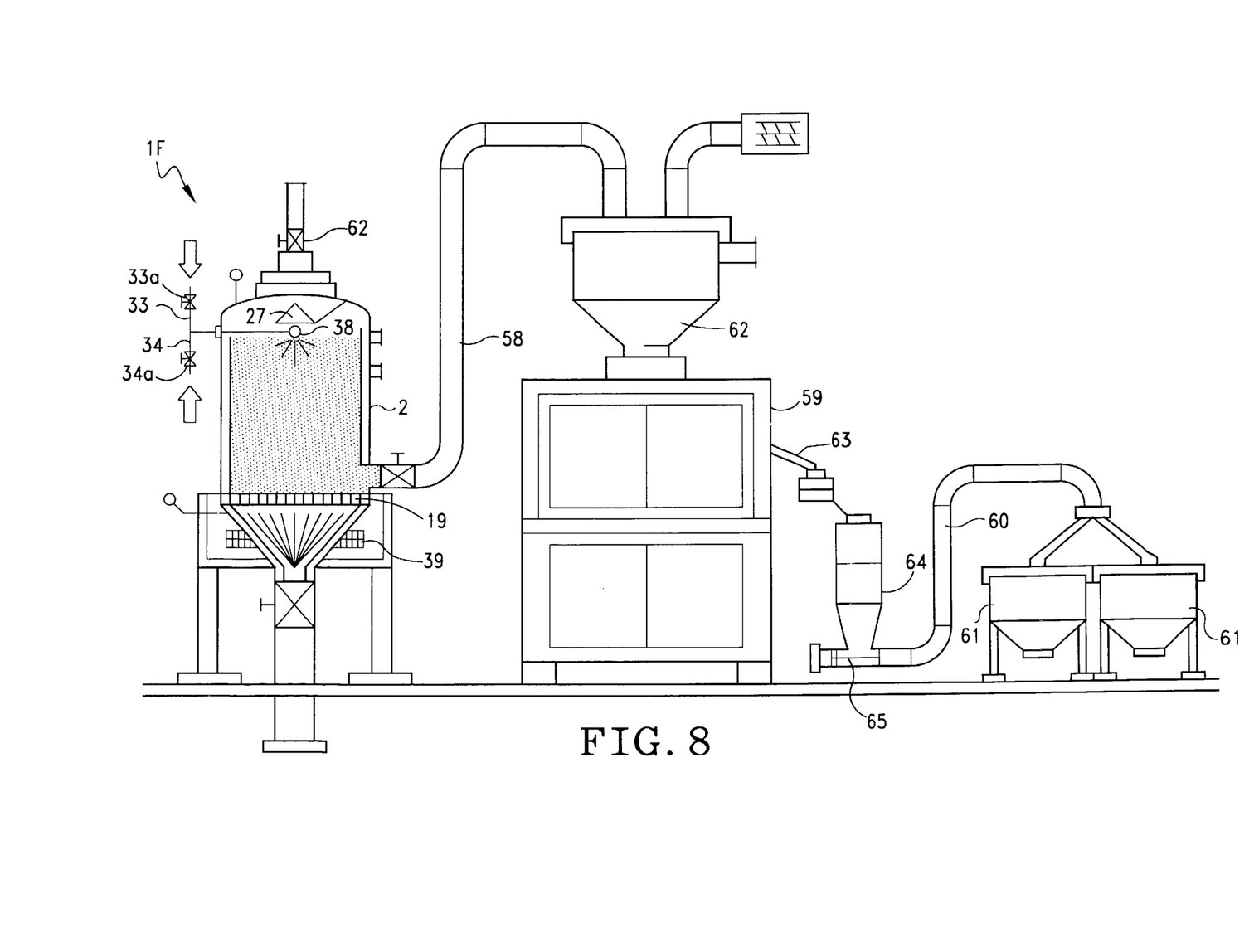
FIG. 8 shows a construction of a fifth embodiment of a pneumatic transport system for powdered or granular material, provided with a tabletting machine and a shuttle transport mechanism according to the present invention.

FIG. 8 shows still another pneumatic transportation system 1F. A tabletting machine 59 is connected with the transportation system 1F via a transport pipe 58, a transport pipe 60 transports the tablets produced in the tabletting machine 59 by the use of a shuttle 65, and two tablet receivers 61, 61 receive the transported tablets.

A tank 2 of the pneumatic transport system 1F has the same construction as the tank 2 of the pneumatic transport system 1D and a material supply valve 62 is provided above the tank 2 for feeding powdered or granular material.

The material which is transported from the tank 2 via the pipe 58 is fed into a hopper 65 provided above the tabletting machine 59 so as to be supplied in the tabletting machine 59.

A powder eliminator 63 is connected with the tabletting machine 59 for removing extra powders attached on the tablets by the use of pulsating vibration air. The tablets treated in the powder eliminator 63 are supplied in the shuttle 65 provided in the transport pipe 60 via a feeder 64. The shuttle 65 filled with the tablets in transported by compressed air in the transport pipe 60 and the tablets are received in the tablet receivers 61, 61.

The shuttle 65 is returned to its original position in the transport pipe 60 after transporting the tablets, and tablets are supplied again in the shuttle 65 so as to repeat transportation of tablets.

The material is convectionally mixed by low flow using pulsating vibration air, transported in the pipe 58, supplied in the tabletting machine 59 from the hopper 65, and compressed as tablets in the tabletting machine 59. Extra powder attached on the tablets is removed by the use of pulsating vibration air in the powder eliminator 63. Then the tablets are transported in the pipe 60 by the shuttle 65 into the receiver 61.

In this way material is mixed, transported and tabletted. The tablets are transported and stored sequentially according to the present invention.

A cyclone is used as a material recovery means in the above embodiments, but other material recovery means can be used.

As mentioned above, convection is forcibly caused for powdered or granular material stored on the porous bottom plate in the tank by supplying pulsating vibration air from the bottom of the tank so as to push up the material The material is uniformly and quickly mixed without scattering compared to the prior mixing method wherein pressurized air is blown.

According to the break method of caking of powdered or granular material, a caked layer of powdered or granular material is forcibly broken by supplying pulsating vibration air from the bottom of the tank so as to push up the material. Blockage can be surely prevented without making noise nor damaging the tank and bridging of material ca be also efficiently prevented compared to the prior method wherein an air hammer or a vibrator is used.

According to the mixing system for powdered or granular material its construction can be made simple because a ming vane isn't required. Moreover, noise during operation is reduced because a rotating part isn't required comparing to a mixer with a mixing vane or a tumbler type mixer.

The material in the tank is mixed while generating convection in low fluidized condition and inflating a little in the tank. The amount of mixing material can be made large comparing to the tank of the same size which is provided with a mixing vane or designed to rotate the tank.

According to the mixing system for powdered or granular material, material is returned to the tank by separating the fine particles generated during mixing of the material. The waste consumption of the material is prevented and the material is recycled.

According to the pneumatic transport system for powdered or granular material, the material mixed and stored in the tank is pneumatically transported by means of pulsating vibration air and by receiving pressurized gas, resulting in smooth transportation. Therefore, cohesive material can be pneumatically transported in a transport pipe without causing bridging or adhesion in the pipe. Further, ratholes and blockage in the pipe are also prevented.

According to the pneumatic transport system for powdered or granular material, the material is separated from the fine particles generated during mixing and returned to the tank. The material isn't consumed by the vane and is recycled efficiently.

Powdered or granular material is granulated by injecting a binder liquid from a spray gun while the material is suspended in the tank by the use of pulsating vibration air supplied from the bottom of the tank. After granulation, the granulated material is pneumatically transported by the use of pressurized gas supplied from gas supply means while pulsating vibration air is fed in the tank. It isn't required to take out the granulated material and transport by a separate transporting means. In this system, granulation, mixing and transportation of powdered or granular material can be executed sequentially.

Figure 9:
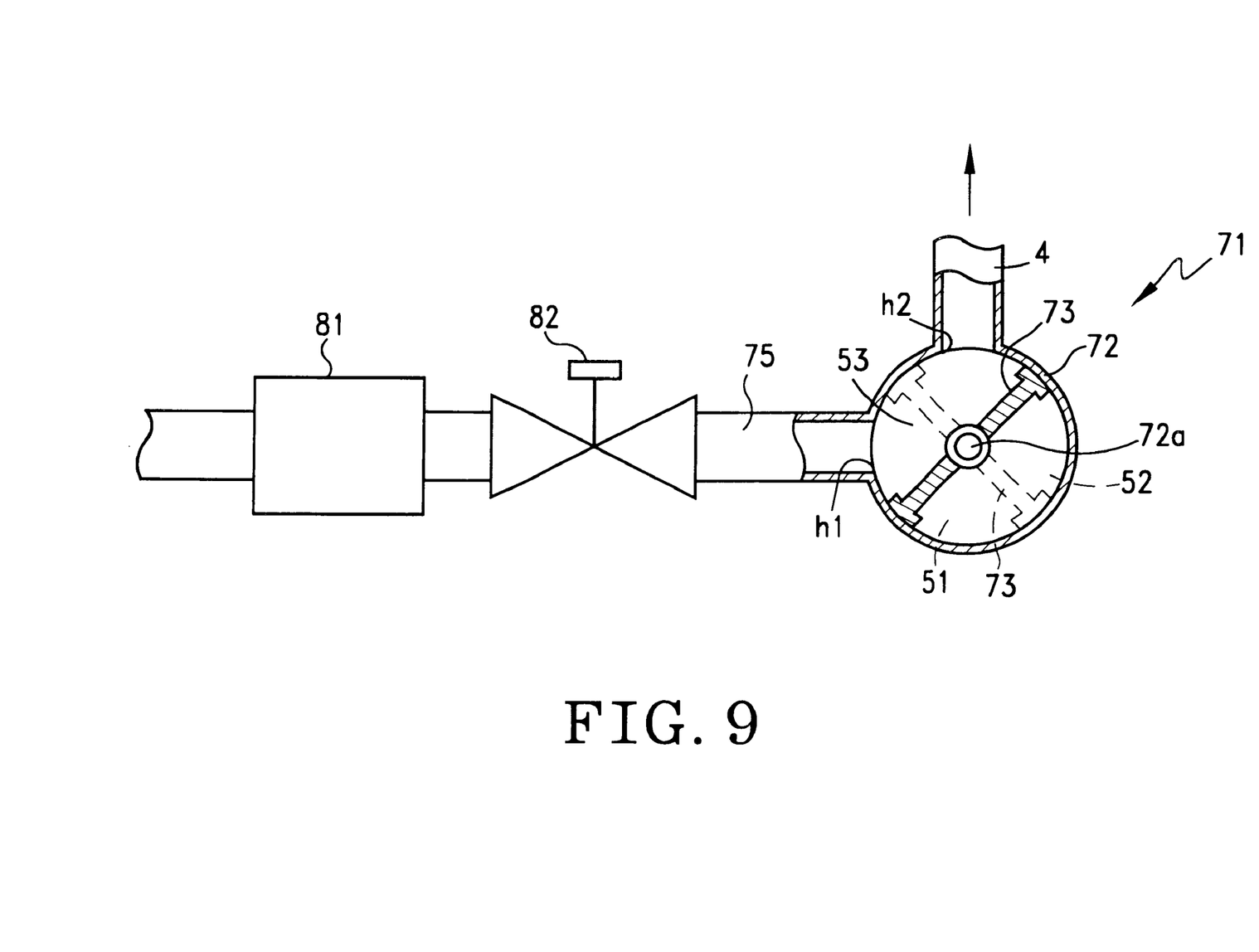
FIG. 9 shows a sectional view of a rotary type pulsating vibration air generation means.

FIG. 9 shows a sectional view of a rotary type pulsating vibration air generation means.

The pulsating vibration air generation means 71 is connected to the conduit pipe 4 as a pulsating vibration air generation means of a mixing and blending system for powdered or granular material. The pulsating vibration air generation means 71 is provided with a cylindrical casing 72, a rotary valve 73 provided for rotation at a central axis 72a of the casing 72. The rotary valve 73 divides the inside of the casing 72 into two spaces S1 and S2. A driving means (not shown) such as a motor provided for rotating the rotary valve 73, and a control means (not shown (for controlling the rotational speed of the rotary valve 73 are also provided. A conduit 75 and a conduit pipe 4 (refer to a conduit pipe 4 in FIG. 1) are connected with the casing 72.

In this embodiment, a connecting port h1 for the conduit 75 and a connecting port h2 for the conduit pipe 4 are arranged at about 90° around the central axis 72a. The conduit 75 is connected with an air source 81, such as a blower, and pressurized air at constant pressure is supplied to the casing 72 via the conduit 75 when the air source 81 is driven. The conduit 75 includes an air control valve 82 for controlling the flow rate of the pressurized air supplied into the conduit 75.

As for the air control valve 82, a well-known air control valve such as a solenoid valve can be used if the flow rate of pressurized air flowing in the conduit 75 is controlled. However, the air control valve 82 is not always necessary.

Next, the method for supplying pulsating vibration air into a tank (tank 2 shown in FIG. 1) by means of the pulsating vibration air generation means 71 will be described.

When the air control valve 82 is provided, it is controlled appropriately. Then a driving means (not shown) of the pulsating vibration air generation means 71 is driven at a fixed rotational speed so that the rotary valve 73 rotates at the fixed speed. The rotational speed of the rotary valve 73 is controlled by a control means (not shown) of the pulsating vibration air generation means 71.

Then, the air source 81 is driven and pressurized air at constant pressure and a fixed amount is supplied into the conduit 75. The pressurized air supplied in the conduit 75 is further supplied into the casing 72 via the connecting port h1 after the air control valve 82 controls the pressurized air at a fixed pressure and a fixed amount when the air control valve 82 is provided.

The pressurized air supplied in the casing 72 is converted into a pulsating vibration air by the rotary valve 73 rotating in the casing 72 and discharged into the conduit pipe 4 from the connecting port h2. The pulsating vibration air produced by the pulsating vibration air generation means 71 is clearly different from the intermittent air generated by opening and closing the conduit valve 4 by means of an opening and closing means such as a solenoid valve provided between the conduit connecting the air source 81 and the tank 2. The pressurized air supplied to the casing 72 via the connecting port h1 is compressed in the space S1 (space where the connecting port h1 is positioned) which is formed by the casing 72 and the rotary valve 73 because the pressurized air is supplied from the connecting port h1 when the rotary valve 73 is positioned so as to close the connecting ports h1 and h2 (the rotary valve 73 is shown with the dotted line in FIG. 9).

On the other hand, in the space S2 (space where the connecting port h2 is positioned) which is formed by the casing 72 and the rotary valve 73, the pressurized air stored therein is discharged to the conduit pipe 4 via the connecting port h2 while the supply of the pressurized air from the air source 81 is shut off The discharge of the pressurized air stored in the space S2 into the conduit pipe 4 via the connecting port h2 is stopped when the air pressure in the space S2 and in the conduit pipe 4 become almost the same.

The pressurized air supplied to the casing 72 via the connecting port h1 is supplied to the conduit pipe 4 via the connecting port h2 in the space S3 (space where the connecting port h1 is positioned) which is formed by the casing 72 and the rotary valve 73 while being supplied with pressurized air from the air source 81 when the rotary valve 73 is positioned where the connecting ports h1 and h2 are communicated (the rotary valve 73 is shown with the solid lie in FIG. 9). The pressurized air stored in the space section S4 formed by the casing 72 and the rotary valve 73 is maintained.

Such a phenomenon is carried out repeatedly according to the rotation of the rotary valve 73 and pulsating vibration air is transmitted to the conduit pipe 4 from the connecting port h2 in the direction of the tank 2 (tank 2 in FIG. 1).

Adjustment of the driving amount of the air source 81, adjustment of the air control valve 82, if provided, and adjustment of the rotational speed of the rotary valve 73 are executed solely or in combination so that many kinds of pulsating vibration air with different frequency and amplitude can be generated in the conduit pipe 4.

The wave shape of the pulsating vibration air is designed to be appropriate for mixing the powdered material in the tank 2. Therefore, the wave shape is determined according to the particle diameter, viscosity, and physical property of the powdered material. According to such an adjustment, pulsating vibration air which has a fixed frequency and both the peak and valley of the amplitude are positive, or pulsating vibration air which has a fixed frequency and the peak of the amplitude is positive and the valley is atmospheric pressure can be generated.

The pulsating vibration air supplied to the conduit pipe 4 through the connecting port h2 of the casing 72 is continuously transmitted into the tank 2 via the conduit pipe 4 under a bottom pale 5 of the tank 2 upwardly so as to push up the powdered material stored on the bottom plate 5. Consequently, mixture and dispersion of the powdered material into the pulsating vibration air can be executed smoothly.

According to the pulsating vibration air generation means 71, the rotary valve 73 is driven to be rotated by means of the driving means such as a motor (not shown). Therefore, the rotary valve 73 is controlled at a fixed speed regardless of the flow rate of the pressurized air supplied to the casing 72 from the air source 81 and pulsating vibration air at a fixed frequency can be steadily supplied in the conduit pipe 4.

Further, the frequency of the pulsating vibration air can be set free of the pressurized air supplied in the casing 72 from the air source 81. The pulsating vibration air generation means 71 is provided with the rotary valve 73 which divides the inside of the casing 72 into two spaces in the above-mentioned embodiment, however, a rotary valve (not shown) which divides the inside of the casing 72 into three spaces may be provided.

Figure 10:
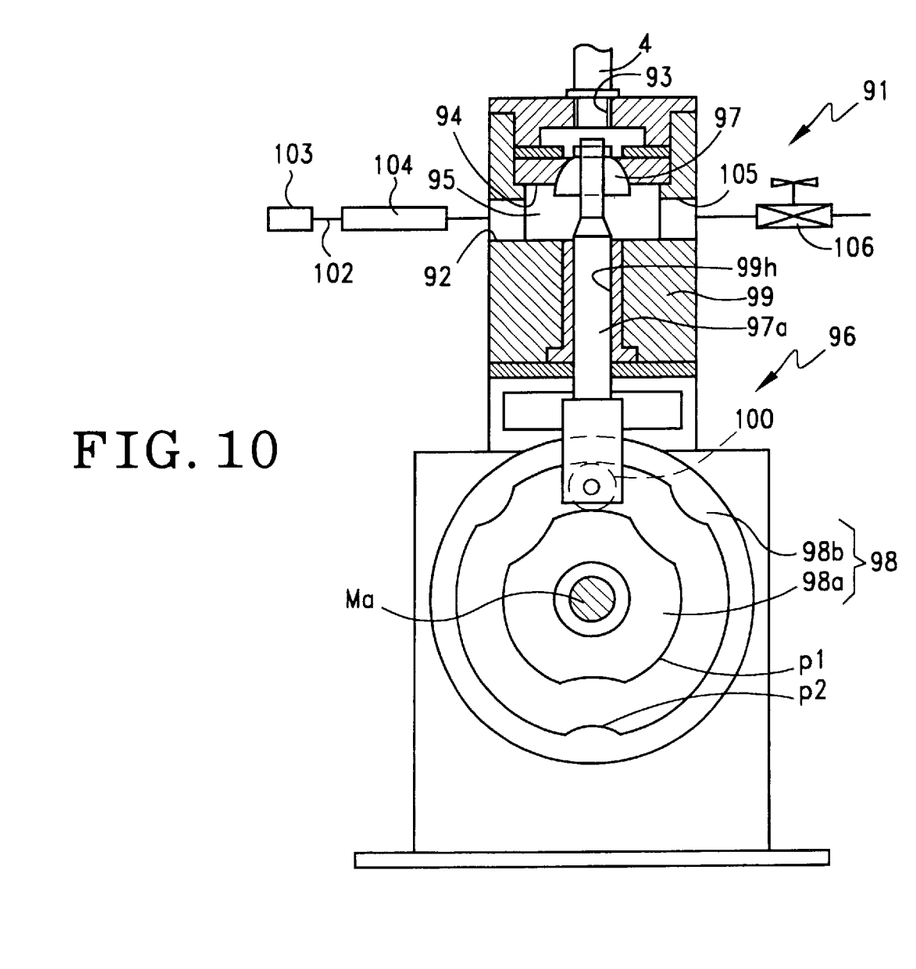
FIG. 10 shows a sectional view of a cam type pulsating vibration air generation means.

FIG. 10 shows a sectional view of a cam type pulsating vibration air generation means, the other embodiment of the pulsating vibration air generation means.

The pulsating vibration air generation means 91 is provided with a valve chamber 95 having a valve seat 94 between an inlet port 92 and an outlet port 93, a valve plug 97 for opening and closing the valve seat 94, a cam mechanism 96 for moving the valve plug 97 up and down, and a case body 99 for including the cam mechanism 96. A through hole which is narrowed in the direction of the outlet port 93 is provided for the valve seat 94.

The valve plug 97 is formed like a circular cone with a narrowed end in accordance with the shape of the valve seat 94 and is designed so as to close the valve seat 94 airtightly. The valve plug 97, which is provided with an axis 97a is stored airtightly and movable up and down in a axial hole 99h of the case body 99. A roller 100 is rotatably attached on the lower end of the axis 97a.

The cam mechanism 96 is provided with a rotary groove cam 98 rotatably attached by means of a driving means (not shown) such as a motor. The rotary groove cam 98 is constructed such that the roller 100 is rotatably inserted at the lower end of the axis 97a of the valve plug 97. The rotary groove cam 98 is also provided with concave and convex patterns p1 and p2. The rotary cam 98 is provided with an inner rotary cam 98a and an outer rotary cam 98b. The concave and convex pattern p1 of the inner rotary cam 98a and the concave and convex pattern p2 of the outer rotary cam 98b are designed to be aligned with each other so as to have a space which is the same as or larger than the diameter of the roller 100.

The roller 100 is rotatably inserted between the inner rotary cam 98a and the outer rotary cam 98b. When the rotary cam 98 is rotated, the roller 100 moves up and down accurately according to the concave and convex pattern p1 of the inner rotary cam 98a and the concave and convex pattern p2 of the outer rotary cam 98b. As a result, the valve plug 97 moves accurately up and down according to the patterns p1 and p2 so that the valve plug 97 opens and closes the valve seat 94.

The inlet port 92 is connected to an air source 103 such as a blower via a conduit 102. An air control valve 104 is interposed in the conduit pipe 102 for controlling the flow rate of the pressurized air in the conduit pipe 102. Well-known open and shut valves such as a solenoid valve can be used for the air control valve 104 if it can control the flow rate of the pressurized air supplied in the conduit 102. However the air control valve 104 isn't always necessary. The outlet port 93 is connected to the conduit pipe (the conduit pipe 4 shown in FIG. 1).

The numeral 105 in FIG. 10 refers to an air control port. The air control port 105 is provided with an air control valve 106. The air control valve 106 is designed to control the port 105 at a desired condition between the time before it is completely closed after it is completely communicated with atmospheric air. The air control valve 106 isn't specifically limited in the present invention if it can control the opening rate of the output port 93 at a desired rate. Many kinds of well-known open and shut valves such as a solenoid valve can be used. However, is isn't always necessary.

Then, the method for supplying pulsating vibration air to the tank (tank 2 in FIG. 1) by means of the pulsating vibration air generation means 91 will be explained.

According to the particle diameter, viscosity, and physical property of the powdered material stored in the tank 2, the rotary cam 98 having concave and convex patterns p 1 and p2 which can produce pulsating vibration air with wave shapes appropriate for easy mixture or powdered material is selected. The selected rotary cam 98 is attached with a rotational axis Ma of the driving means (not shown) for the rotary cam 98.

Next the air control valve 104 is adjusted when it is provided. When the air control valve 106 is provided, it is also adjusted. Then, the rotary axis Ma is rotated at a fixed speed by actuating the driving means (not shown) so that the rotary cam 98 is rotated at a fixed speed. Further, the air source 103 is driven so as to supply pressurized air with a fixed constant air pressure and a fixed flow rate in the conduit pipe 102. When air control valve 104 is provided, the pressurized air supplied in the conduit 102 is adjusted to be a desired pressure and flow rate, then supplied to the valve chamber 95.

When the rotary cam 98 is driven at a fixed rotational speed, the valve plug 97 moves up and down according to the concave and convex patterns p1 and p2 of the rotary cam 98.

The pulsating vibration air is discharged from the outlet port 93 to the conduit pipe 4. The pulsating vibration air generated by means of the pulsating vibration air generating means 91 is completely different from the intermittent air generated by opening and closing the conduit valve 4 by means of an opening and closing means such as a solenoid valve provided between the conduit connecting the air source 81 and the tank 2. When the conduit 4 is opened and closed by an open and shut means such as a solenoid valve provided for the conduit connecting the air source 103 and the tank 2, intermittent air is transmitted to the conduit 4. On the other hand, when the pulsating vibration air generation means 91 is provided, the valve seat 94 is opened and closed by means of the valve plug 97 moving up and down according to the convex and concave patterns p1 and p2 of the rotary cam 98. Therefore, pulsating vibration air having wave shapes according to the patterns p1 and p2 can be transmitted to the conduit pipe 4.

Adjustment of the driving amount of the air source 103, adjustment of the air control valve 82 if provided, adjustment of the air control valve 106 if provided, adjustment of the rotational speed of the rotary cam 98, exchange of the rotary cam 98 are executed solely or in combination so that many kinds of pulsating vibration air with different frequency, amplitude and wave shape can be generated in the conduit pipe 4. Pulsating vibration air which has a fixed frequency and the peak and valley of the amplitude are positive, or pulsating vibration air which has a fixed frequency and the peak of the amplitude is positive and its valley is almost atmospheric pressure can be generated by such an adjustment.

The pulsating vibration air supplied to the conduit 4 from the outer port 93 of the pulsating vibration air generating means 91 is transmitted in then tank 2 via the conduit 4 and continuously supplied therein under the bottom plate 5 of the tank 2 upwardly so as to push up the powdered material stored on the plate 5.

When pulsating vibration air is supplied to the conduit 4 or the tank 2, the pipe 4, the tank 2 and the bottom plate 5 are vibrated by the pulsating vibration air. Therefore, when the blockage of the powdered material in the tank 2 is caused, such a blockage is broken by means of the cooperation of the pulsating vibration air and the vibration of the pipe 4, the tank 2 and the plate 5. Consequently, mixture and dispersion of the powdered material into the pulsating vibration air can be executed smoothly.

According to the pulsating vibration generation means 91, the rotary cam 98 is driven to be rotated by means of the driving means such as a motor (not shown). Therefore, the rotary cam 98 is controlled at a fixed speed regardless of the flow rate of the pressurized air supplied to the valve chamber 95 from the air source 103 and pulsating vibration air with a fixed frequency can be steadily supplied in the conduit pipe 4. Further, the frequency of the pulsating vibration air can be set free of the pressurized air supplied to the valve chamber 95 from the air source.

The rotary type pulsating vibration air generation means requires accurate clearance between the casing 72 and the rotary valve 73. However according to the cam type pulsating vibration air generation means 91, such a problem sn't caused and leakage of air flow is relatively small. Therefore, the system can be enlarged.

According to the cam type pulsating vibration air generation means 91, the frequency of the pulsating vibration air is determined by the number of convex lobes of the inner rotary cam 98*a* (the number of concave lobes of the outer rotary cam 98b) when the valve plug 97 completely closes the valve seat 94. When an air sorce such as a compressor which can generate air with high pressure is used as the air source 103, the valve seat 94 is accurately opened and closed by the valve plug 97. Therefore, pulsating vibration air with high rising wave shape can be generated easily.

The pulsating vibration air generation means 71 and 91 is explained using the mixing and blending system for powdered or granular material 1. However, the pulsating vibration air generation means 71 and 91 can be preferably used for the mixing and blending system 1A, 1B, and the pneumatic transport system 1C, 1D, 1E, and 1F.

What is claimed is:

1. A mixing and blending system for powdered or granular material utilizing pulsating vibration air, comprising:

a tank having a porous bottom plate for storing powdered or granular material thereon;

a rotary type pulsating vibration air generation means for converting compressed air supplied from an air source into pulsating vibration air at a fixed frequency, said rotary type pulsating vibration air generation means comprises a casing connected to the air source via a first conduit and connected to said tank below said porous bottom plate via a second conduit, a rotary valve provided rotatably in said casing, said rotary valve airtightly dividing the inside of said casing into at least two parts, and driving means for rotating said rotor at a fixed rotational speed, whereby the generated pulsating vibration air at the fixed frequency is continuously introduced into said tank from the bottom of said tank so as to generate air flow pushing the powdered or granular material upwardly through the porous bottom plate of said tank, and powdered or granular material stored on said porous bottom plate in said tank is lifted up to be mixed together uniformly by convection generated in said tank;

a material recovery means provided above said tank, said material recovery means comprising: a cyclone body having at the upper part an air outlet connected to a filter for separating fine particles dispersing in said tank from air and at the lower part a material discharge port with said valve for selectively opening or closing directly connected to said tank in which said valve is opened when retuning powdered or granular material collected by said body;

a material recovery conduit connected to said tank from a side wall of said cyclone body; and another valve provided on said material recovery conduit in which said further valve is opened during a mixing process in order to introduce fine particles dispersing in said tank into said cyclone body.

2. A mixing and blending system as defined in claim 1, further comprising:

spray means for spraying a binder solution in said tank of the system.

3. A pneumatic transport system for powdered or granular material utilizing pulsating vibration air, comprising:

a tank having a porous bottom plate for storing powdered or granular material thereon;

a material collecting tank for receiving powdered or granular material pneumatically transported from said tank, said material collecting tank being connected to a material transport pipe including valve means therein;

pulsating vibration air generation means connected to an air source via a first conduit and connected to the lower part of said tank below said porous bottom plate via a second conduit, whereby in a mixing operation said valve means is closed when the pulsating vibration air generated at a fixed frequency by driving said pulsating vibration air generation means is supplied into said tank below said porous bottom plate of said tank upwardly, thereby the powdered or granular material stored on said porous bottom plate in said tank is lifted up and mixed together uniformly by convection generated in said tank, and in a transporting operation said valve means is opened while the pulsating vibration air generated at a fixed frequency by driving said pulsating vibration air generation means is supplied into said tank below said porous bottom plate of said tank, thereby the powdered or granular material stored on the porous bottom plate in said tank is pneumatically transported into said collecting tank;

material recovery means above said tank, said material recovery means comprising: a cyclone body having at the upper part an air outlet connected to a filter for separating fine particles dispersing in said tank from air and at the lower pat a material discharge port with said valve for selectively opening or closing directly connected to said tank in which said valve is opened when returning powdered or granular material collected by said body;

a material recovery conduit connected to said tank from a side wall of said cyclone body; and another valve further provided on said material recovery conduit in which said another valve is opened during the mixing process in order to introduce fine particles dispersing in said tank into said cyclone body.

4. The pneumatic transport system forpowdered or granular material utilizing pulsating vibration air as defined in claim 3, wherein pressurizing means is further provided on said tank, powdered or granular material stored in said tank is pneumatically transported into said collecting tank due to the cooperative action of compressed air supplied from said pressurizing means and pulsating vibration air supplied from said pulsating vibration air generation means.

5. The pneumatic transport system for powdered or granular material utilizing pulsating vibration air as defined in claim 3, wherein said pulsating vibration air generation means, comprises:

a casting connected to said air source via a first conduit and connected to said tank below said porous bottom plate via a second conduit, a rotary valve provided rotatable in said casing, said rotary valve airtightly dividing the inside of the casting into at lest two parts, and driving means such as a motor for rotating said rotary valve at a predetermined rotational speed.

6. The pneumatic transport system for powdered or granular material utilizing pulsating vibration air as defined in claim 3, wherein a spray means for spraying a binder solution is further provided at a fixed position in said tank.

* * * * *

UNITED STATES PATENT AND TRADEMARK OFFICE
CERTIFICATE OF CORRECTION

PATENT NO.    : 6,302,573 B1                                      Page 1 of 1
DATED         : October 16, 2001
INVENTOR(S)   : Kiyoshi Morimoto et al.

It is certified that error appears in the above-identified patent and that said Letters Patent is hereby corrected as shown below:

Column 15, claim 1,
Line 45, "retuning" should be -- returning --.

Column 16, claim 3,
Line 26, "pat" should be -- part --.

Column 16, claim 4,
Line 38, "forpowdered" should be -- for powdered --.

Column 16, claim 5,
Line 53, "rotatable" should be -- rotatably --; and
Line 55, "lest" should be -- least --.

Signed and Sealed this

Ninth Day of April, 2002

Attest:

JAMES E. ROGAN
Attesting Officer      Director of the United States Patent and Trademark Office